H. P. KENNIHAN.
TIRE CHAIN CONNECTOR.
APPLICATION FILED MAR. 6, 1922.
1,436,505.
Patented Nov. 21, 1922.
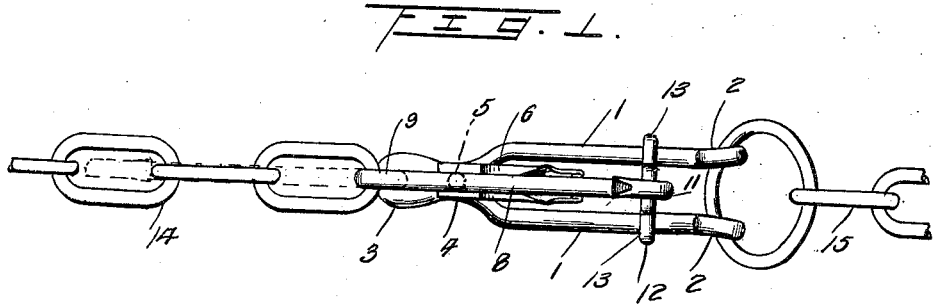
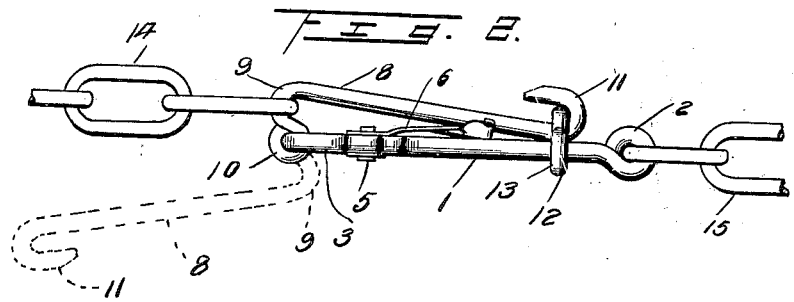
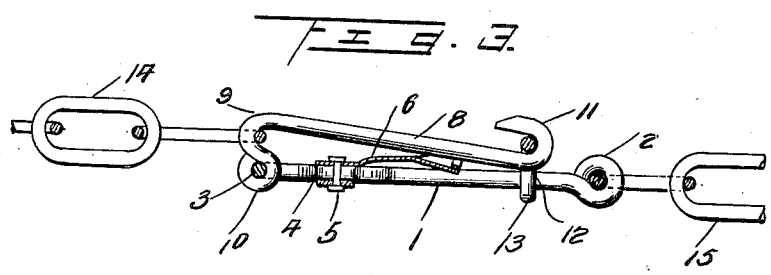
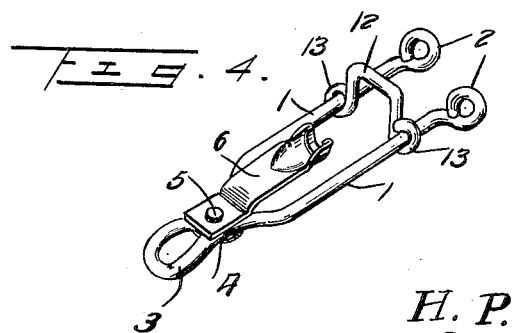
Inventor
H. P. Kennihan
Attorney Patented Nov. 21, 1922.

1,436,505

UNITED STATES PATENT OFFICE.

HOWARD P. KENNIHAN, OF BAKERSTOWN, PENNSYLVANIA.

TIRE-CHAIN CONNECTOR.

Application filed March 6, 1922. Serial No. 541,532.

*To all whom it may concern:*

Be it known that I, HOWARD P. KENNIHAN, a citizen of the United States, residing at Bakerstown, in the county of Allegheny and State of Pennsylvania, have invented certain new and useful Improvements in Tire-Chain Connectors; and I do hereby declare the following to be a full, clear, and exact description of the invention, such as will enable others skilled in the art to which it appertains to make and use the same.

The primary intent of the present invention is the provision of a connector for uniting the ends of a tire chain whereby to prevent separation thereof, even though the chain should become slack by reason of one or more cross chains becoming broken or detached, and which connector also serves as means for drawing the ends of the chains together when initially fitting the same to the tire.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the nature of the invention.

Referring to the accompanying drawings forming a part of the application,

Figure 1 is a plan view of a chain connector embodying the invention, showing the same in operative position and end portions of the chain coupled thereby, the dotted lines indicating the position of the catch when disengaged from the lever.

Figure 2 is an edge view, the lever being extended and the catch drawn back by dotted lines and the full lines indicating such part in operative position, Figure 3 is a central longitudinal section, and Figure 4 is a detail perspective view of the link and the catch and spring attached thereto.

Corresponding and like parts are referred to in the following description and designated in the several views of the drawings by like reference characters.

The connector comprises a link, a lever pivoted at one end to an end portion of the link, a flat spring cooperating with the lever, and a catch slidable upon the link into and out of engagement with the hooked end of the lever.

The link is elongated and formed of a stout wire or rod doubled upon itself to provide parallel members 1 which terminate at their free ends in eyes 2. An eye 3 is provided at the folded or closed end of the link and the end portions of the side members 1 adjacent the eye 3 are drawn together as indicated at 4. A rivet 5 or like fastening is received between the inwardly drawn parts 4 comprising the side members of the link. A flat spring 6 is secured at one end to the link by means of the rivet or fastening 5. The opposite or free end of the spring 6 is made half rounding to insure positive engagement with the lever 8, whereby to prevent lateral displacement.

The lever 8 consists of a stout wire or rod, having a hook 9 and an eye 10 at one end and a hook 11 at the opposite end, the eye and hook being in the same plane. The eye 10 of the lever 8 engages the eye 3 of the link and pivotally connects the lever thereto. The hooked end 11 of the lever 8 is adapted to occupy a position between the side members 1 of the link. The hooked end 11 is normally pressed outwardly by means of the spring 6, this being of advantage to prevent disengagement of the catch from the lever when the parts are in engagement.

The catch 12 is of U-form and its side members terminate in eyes 13 which receive the side members 1 of the links upon which the catch is slidable. The U-form of the catch enables the same to pass readily over the hooked end 11 of the lever 8, disengagement of the catch from the lever when in operative position being prevented by the outward disposition of the hooked end 11 due to the action of the spring 6.

In practice, one end of the chain to be connected is attached to the link by means of the eyes 2 and the opposite end of the chain is engaged by the hooked portion 9 of the lever 8, the two ends 14 and 15 being drawn together by moving the lever 8 from the dotted-line position of Figure 2 into the full-line position, the catch 12 being moved on the link to engage the hooked end 11 of the lever and retain the same in operative position, as indicated most clearly by full lines in Figures 1 and 2.

What is claimed is:

1. A connector of the character specified, comprising a link including parallel side members having an eye at one end, and having the side members adjacent the eye drawn inwardly, a flat spring secured at one end to the inwardly drawn portions of the side members of the link, a lever having one end engaging the eye of the link and provided at its free end with a hook, and a catch slidable upon the side members of the link and adapted to engage the hooked end of the lever and prevent it from casual disengagement therefrom by means of the said spring.

2. A connector of the character specified, comprising an elongated link including parallel side members having eyes at their free ends, and an eye at the opposite end of the link with the side members adjacent the eye drawn inwardly, a fastening confined between the inwardly drawn end portions of the side members comprising the link, a flat spring secured at one end to the link by means of said fastening and having its opposite end of half-round formation, a lever pivoted at one end to the eye at the contracted end of the link and having a hook at its opposite or free end, and a U-shaped catch having eyes at the terminals of its side members loosely receiving the side members of the link.

In testimony whereof I affix my signature in presence of two witnesses.

HOWARD P. KENNIHAN.

Witnesses:
M. MENDEL,
C. H. CRITCHLOW.